June 3, 1969  S. C. MICKLE  3,447,427
PISTON RIDER RING
Filed Aug. 8, 1967
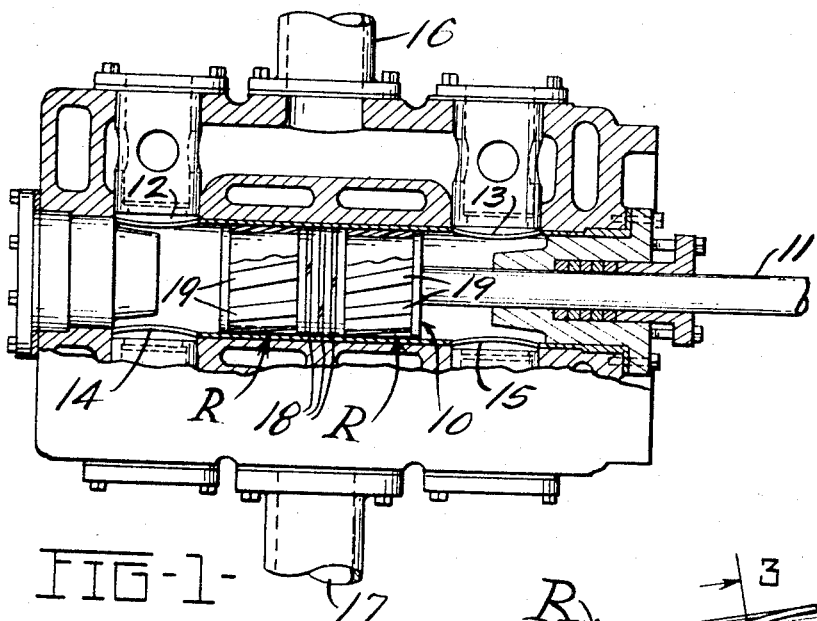
FIG-1-
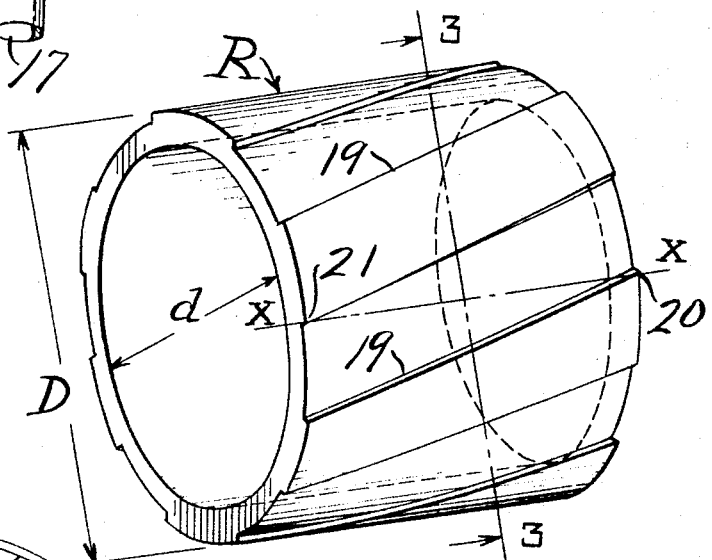
FIG-2-
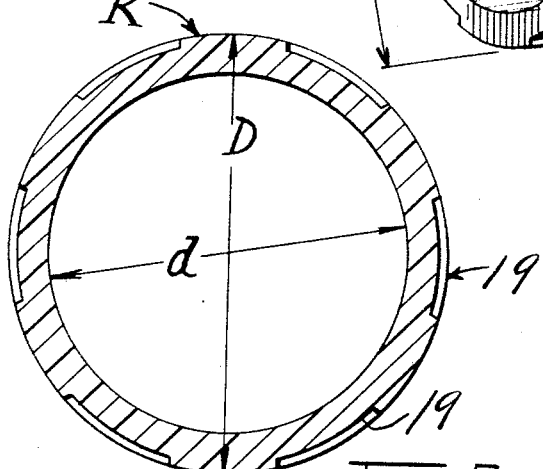
FIG-3-
INVENTOR:
SCOTT C. MICKLE.
BY Owen + Owen
ATT'YS.

United States Patent Office 3,447,427
Patented June 3, 1969

3,447,427
PISTON RIDER RING
Scott C. Mickle, Fredericktown, Ohio, assignor to Cooper Industries, Inc., Mount Vernon, Ohio, a corporation of Ohio
Filed Aug. 8, 1967, Ser. No. 659,061
Int. Cl. F16j 9/12
U.S. Cl. 92—253                3 Claims

ABSTRACT OF THE DISCLOSURE

An improved rider ring for compressors having at least one cylinder and piston. Rider rings are used in both horizontal and vertical machines to support or guide the piston within its cylinder. The rider ring is fabricated from a low friction material and comprises a unitary band held within a relieved area of the piston. The effective outside diameter of the rider ring is larger than that of the piston so that a substantial portion of the weight of the piston and its piston rod is supported by the rider ring, in the case of a horizontal machine. A plurality of grooves in the outer surface of the rider ring extends throughout its length at an angle to its axis such that adjacent lands on each side of any groove will intersect any axial line passing through any groove. The depth of the grooves is sufficient to permit fluid passage therethrough to prevent the build-up of a substantial pressure differential between the ends of the rider ring. The grooves of the rider ring extend spirally or at an angle to the axis of the rider ring so that the piston will not bottom out or rest upon a groove which would drop the piston from the desired supported or guided position.

Background of the invention

In horizontal reciprocating compressors, particularly of large capacity, it is necessary to support a substantial portion of the weight of the piston and its associated crank upon some member other than the piston compression rings and the piston itself. In vertical reciprocating compressors, proper stabilization or guidance for the piston must be provided by surfaces other than the compression rings. In non-lubricated reciprocating compressors, certain low friction materials, such as filled tetrafluoroethylene polymers, have been used with some success in the fabrication of rider rings which essentially consist of a unitary band of the low friction material which is placed within a groove in the piston. The primary function of a piston rider ring is to carry or support the total piston weight and a portion of the rod weight, and, when properly designed, does not act as a pressure sealing or compression element.

The major design consideration for rider rings of these relatively soft, low friction materials has been the proper diametrical running clearance, or the difference between the outside diameter of the rider ring and the bore of the cylinder. Thermal expansion of the piston and rider ring materials must be considered in designing a rider ring. Because the function of the rider ring is support or guidance and not pressure sealing, previously designed rider rings have been intentionally undersized to prevent the build-up of a substantial pressure difference over the length of the rider ring. However, due to different operating temperatures, density of compressed gases, etc., a number of rider ring failures have occurred due to insufficient diametrical clearance which causes a pressure build-up on one end of the rider ring which consequently forces the relatively soft, low friction material towards the low pressure end. This creates a bulge and increase in radial dimension (pressure energized) which eventually causes the rider ring to fail.

The increase in diametrical clearance which can be made to prevent such failures is limited because, as the diametrical clearance is increased, the position of the piston must necessarily drop by one half of the increase of the diametrical clearance. A rider ring designed with excessive clearance fails to support the piston in the center of the cylinder and also reduces the effective radial thickness of the rider ring so that it becomes necessary to decrease the diameter of the piston itself, necessitating a complete design change in the compressor. Thus, the problem encountered is in selecting the optimum rider ring size which would (1) be large enough to properly support the piston, and (2) be small enough to prevent pressure differentials from developing across the length of the rider ring which causes its ultimate failure. As previously stated, in compressing various gases of different density, at various pressures and piston surface speeds, such a satisfactory compromise design is difficult if not impossible to obtain with conventional rider rings.

Brief summary of the invention

In order to overcome the design obstacles set forth above, the improved rider ring of this invention comprises a unitary sleeve of low friction material which has an effective outside diameter, in relation to the diameter of the cylinder, to properly position the piston within the cylinder. To allow for thermal growth of the rider ring, a predetermined initial diametrical running clearance is necessary to allow for thermal growth of the rider ring and the piston, depending upon the material of which they are composed. For example, in an embodiment using a cast iron piston and a tetrafluoroethylene polymer rider ring, an initial running clearance of 0.002 inch per inch of piston diameter plus 0.005 inch is allowed. Such a clearance would be insufficient to prevent failure in a conventional sleeve-type rider ring but has been found to be satisfactory for the improved rider ring of this invention which includes a plurality of grooves extending from one end of the rider ring to the other and spaced about its periphery.

The grooves are designed to have a radial depth such that fluid communication through the grooves will prevent a substantial pressure build-up from one end of the rider ring to the other. Finally, the grooves extend in a spiral or non-axial direction around the surface of the rider ring. This alignment prevents the piston from bottoming out or resting upon one of the grooves which would displace it from its desired center position. Stated another way, each one of the grooves is positioned at an angle to the axis of the rider ring and its piston such that any axial line passing through a groove will intersect portions of the land or rider ring outer surface on either side of the groove. It will be apparent that a rider ring of this design can have an effective outside diameter sufficient to properly position the piston within the cylinder but at the same time will not fail due to a developed pressure differential because of the grooves which serve to relieve or prevent such a pressure build-up.

Brief description of the drawings

FIG. 1 is a cross sectional view of a horizontal compressor including a cylinder and double acting piston with a pair of the improved rider rings of this invention installed on the piston on either side of the compression rings;

FIG. 2 is a view in perspective of an improved rider ring of this invention; and FIG. 3 is a cross sectional view of the rider ring shown in FIG. 2, taken along line 3—3 of FIG. 2.

Brief description of a preferred embodiment

Referring to FIG. 1, a portion of a horizontal compressor is shown in cross section, with its piston, designated by reference numeral 10, connected to a connecting rod 11 which in turn would be connected to a cross head (not shown) driven by a prime mover. The piston 10 is placed within a cylinder having two intake ports 12 and 13 and two exhaust ports 14 and 15 at the ends of the cylinder with an intake manifold 16 and an exhaust manifold 17 connecting the intake and exhaust ports respectively. The construction of the intake and exhaust systems is not considered to be a part of this invention.

The piston carries a number of pressure rings 18 about its axial center with an improved rider ring of this invention installed on each end of the piston and designated by reference numeral R in FIG. 1. As seen in FIG. 1, a substantial portion of the weight of the piston 10, as well as that of its connecting rod 11, is supported by the two rider rings R on each end of the piston.

Referring to FIG. 2, the rider ring R comprises a unitary sleeve of a low friction material such as bronze-filled polytetrafluoroethylene or other suitable material. Using a one-piece-type rider ring, the sleeve or ring R has an interference fit or is stretched by a predetermined amount to fit upon the relieved area or groove in the piston 10. For example, in one embodiment, the inside diameter $d$ of the rider ring R is such that it requires a four percent stretch to place it upon the piston groove.

The outside diameter of the rider ring R, designated D in FIGS. 2 and 3, is large enough to position the piston in its desired central position within the cylinder as previously explained. Because of thermal expansion of the piston and rider ring, some diametrical clearance, for instance according to the formula set forth above, is provided. However, because of the use of the spiral or slanted grooves in the rider ring R of this invention, this amount of diametrical clearance no longer is a difficult design factor.

Extending along the outer surface of the rider ring R is a plurality of grooves 19 which extend from one end of the rider ring to the other and are spiraled or slanted from the axis of the rider ring R. The grooves 19 are slanted to the extent that any axial line drawn through any such groove will intersect the lands on either side of that groove. For instance, the line X—X in FIG. 2 will intersect lands on either side of its groove 19 at the points designated by reference numerals 20 and 21. This is an important part of the invention in that the use of spiral or slanted grooves will prevent the possibility that a rider ring may be turned upon its piston 10 to a position where the piston will bottom out or rest upon the groove, thus dropping it from its desired central position. Accordingly, regardless of the radial depth or circumferential width of the grooves 19 themselves, if they are spiraled or slanted as indicated, their presence cannot change the supported position of the piston 10.

For a specific installation, the optimum amounts of material removal or groove area may be experimentally determined and will depend upon the maximum differential pressure drop across the piston assembly, the density of the gas being compressed, the suction and discharge temperatures, surface speed of the piston, and the possibility of foreign materials entering the cylinder.

I claim:

1. The combination of a fluid cylinder and reciprocating piston, said piston having a low friction support surface comprising an axially extending sleeve circumjacent said piston, said sleeve having an outside diameter greater than said piston diameter and having a plurality of axially extending grooves equally spaced about its circumference, each of said grooves having a radial depth sufficient for fluid communication therethrough and extending at such an angle to the axis of said sleeve that portions of the outer surface of said sleeve on either side of such grooves intersect any axial line on the surface of said sleeve through said groove.

2. In a reciprocating compressor having a cylinder and piston with said piston having at least one pressure ring in one portion of its axial length, the improvement comprising a rider ring positioned radially within a relieved area in said piston with said relieved area and rider ring having substantially the same axial length and being axially spaced from said pressure ring to stabilize said piston, said rider ring having a radial thickness in excess of the radial depth of said relieved area whereby its outer surface extends radially beyond the adjacent outer surfaces of said piston to provide a sliding support surface therefor, and said rider ring having a plurality of grooves spaced about the circumference of its outer surface, each of said grooves having a radial depth sufficient for fluid communication between its bottom surface and the adjacent cylinder wall and extending over the axial length of said rider ring at such an angle to the axis of said rider ring, and having such circumferential width that portions of the adjacent lands on either side of any groove intersect any axial line passing through any such groove.

3. The apparatus of claim 2 wherein said rider ring comprises a unitary sleeve of resilient material having a normal inside diameter slightly less than the outside diameter of said relieved area in said piston whereby said rider ring, when placed upon said piston, is tightly engaged to said piston throughout the internal surfaces of said rider ring.

References Cited

UNITED STATES PATENTS 3,155,015  11/1964  Genz _____ 92—249

CARROLL B. DORITY, Jr., *Primary Examiner.*

U.S. Cl. X.R.

92—255